A. W. DE MEIR.
FASTENER.
APPLICATION FILED APR. 7, 1917.

1,239,362.

Patented Sept. 4, 1917.

WITNESSES
Ray E. Rousseau
I. Wilcox

INVENTOR
Auld Weinberg de Meir,
BY Victor J. Evans
ATTORNEY

UNITED STATES PATENT OFFICE.

AULD WEINBERG DE MEIR, OF PROVIDENCE, RHODE ISLAND.

FASTENER.

1,239,362.  Specification of Letters Patent.  Patented Sept. 4, 1917.

Application filed April 7, 1917. Serial No. 160,439.

*To all whom it may concern:*

Be it known that I, AULD WEINBERG DE MEIR, a citizen of the United States, residing at Providence, in the county of Providence and State of Rhode Island, have invented new and useful Improvements in Fasteners, of which the following is a specification.

This invention relates to laundry fasteners and it consists in the novel features hereinafter described and claimed.

An object of the invention is to provide a fastener of simple structure especially adapted to be used at laundries for connecting the side portions of shirts and the ends of collars or similar articles together preparatory for delivering the same.

With this object in view the fastener comprises a member which is cut and stamped from a single piece of sheet metal and which includes a head portion and a shank divided by an incision into legs or tongues. The said head portion is concaved and the shank extends from the intermediate part thereof thereby leaving prongs at the opposite sides of the shank which are adapted to engage over the material and assist in holding the fastener in place when applied. The concaved configuration of the head makes it possible to readily apply the device and remove the same from the article of clothing and when the shank is inserted through registering button holes of the article the legs are spread in opposite directions whereby the fastener is securely held in position and the adjacent edges or ends of the article are connected together.

In the accompanying drawing:—

Figure 1:
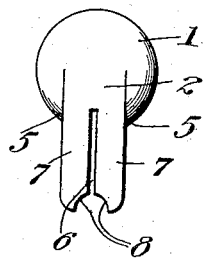
Figure 1 is a plan view of the blank from which the fastener is formed.
Figure 2:
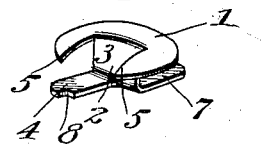
Fig. 2 is a perspective view of the fastener.
Figure 3:
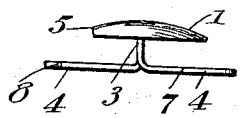
Fig. 3 is an edge view of the same.

As hereinbefore stated the fastener is cut and formed from a single piece of sheet metal and comprises a head 1 which is preferably arcuate or circular in plan. This head is concaved. A shank 2 is provided at the central portion of the head 1 and the said shank is provided with a section 3 which is approximately at a right angle to the plane in which the edge of the head 1 lies. From the section 3 the said shank is extended laterally as at 4, the said lateral extension being approximately at a right angle to the section 3 and having its lower surface lying in the same plane as that in which the edge of the head lies. Inasmuch as the inner portion of the shank 2 is removed from the material which originally was included in the line of curvature of the head 1 the said head 1 is provided at the opposite sides of the shank 2 with pointed prongs 5. The free end portion of the shank 2 is divided by an incision 6 into legs 7. The said incision extends from the end of the shank 2 but terminates short of the section 3 thereof as best shown in Fig. 2 of the drawings. The inner portions of the ends of the legs 7 are provided with recesses 8 into which the finger nail may be readily inserted for the purpose of spreading the legs when the fastener is applied.

To apply the fastener the button holes at the edges or ends of a garment are brought into register with each other and the legs 7 are inserted through the said button hole and the shank is moved through the same so that the tongues 5 lie over the outer surface of the garment and the section 3 of the shank 2 is received in the button hole. By reason of the concavity of the head 1 it is apparent that the finger may be readily inserted under the same in order to pass the legs of the fastener through the button hole and insert the section 3 of the shank 2 therein. After the shank has been inserted through the button hole as indicated the nail of a finger is inserted in the recess 8 of one of the legs 7 and that leg is bent back at the inner end of the incision 6; thus the legs are disposed in opposite directions at the inner side of the garment and the fastener is securely held in position thereon and in turn the said fastener effectually holds the edges or ends of the garment together.

To remove the fastener the operation just described is reversed. Hence it will be seen that a fastener of simple structure is provided, and that the same when applied will effectually hold the edges or ends of a garment together and the fastener is especially adapted to be used in laundries for the purpose of securing the edges of shirts, ends of collars and similar garments together preparatory to delivering the same after they have been laundried.

Having described the invention what is claimed is:—

A fastener formed from a single piece of sheet metal and comprising a head having a curved edge, said head being concaved, a shank connected with the intermediate portion of the head and having a section which is disposed approximately at a right angle to the plane in which the edge of the head lies, the free end portion of the said shank being provided with a longitudinally disposed incision which divides the same into legs and the said legs being provided at the inner portions of their free ends with recesses.

In testimony whereof I affix my signature.

AULD WEINBERG DE MEIR.

Copies of this patent may be obtained for five cents each, by addressing the "Commissioner of Patents, Washington, D. C."